March 14, 1950     M. KLINE     2,500,186
METEOROLOGICAL TELEMETERING SYSTEM
Filed April 24, 1945
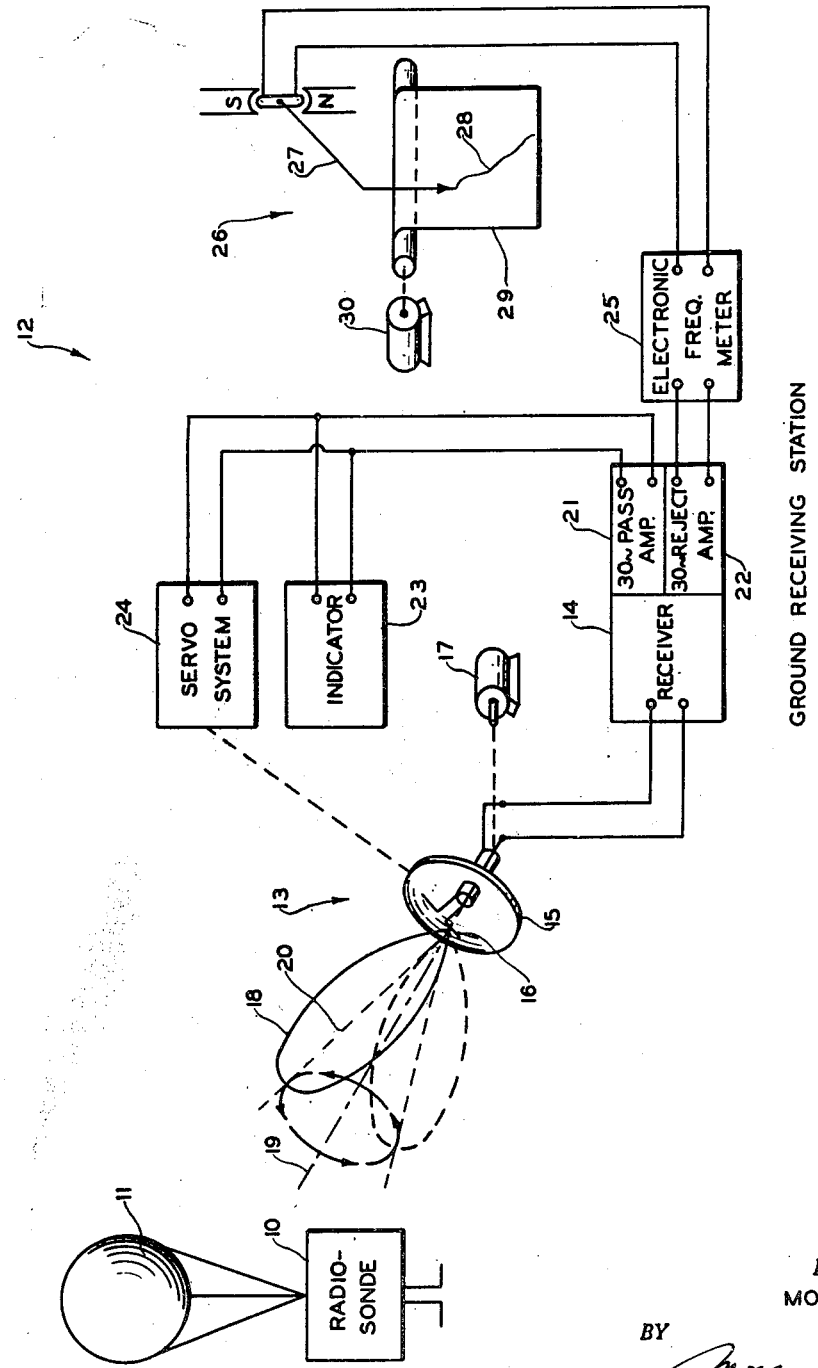
INVENTOR.
MORRIS KLINE
BY
ATTORNEY

Patented Mar. 14, 1950

2,500,186

UNITED STATES PATENT OFFICE 2,500,186

METEOROLOGICAL TELEMETERING SYSTEM

Morris Kline, Little Silver, N. J., assignor to the United States of America as represented by the Secretary of War Application April 24, 1945, Serial No. 590,096

4 Claims. (Cl. 343—117)

(Granted under the act of March 3, 1883, as amended April 30, 1928; 370 O. G. 757)

The invention described herein may be manufactured and used by or for the Government for governmental purposes, without the payment to me of any royalty thereon.

My present invention relates generally to meteorological telemetering systems and more particularly to a method and means for simultaneously receiving wind velocity and radiosonde data.

Various radio techniques are recognized for the investigation of the upper air. In the measurement of wind velocity it is conventional to track from a ground station the flight of a free balloon bearing a continuous-wave transmitter, the tracking being effected by means of a directional receiver. Either by direct computation or graphical methods the path taken by the balloon is derived from the angles observed at known intervals of time, assuming a fixed rate of balloon ascension.

Information regarding the humidity, temperature, and pressure of the upper air is ordinarily afforded by having a radiosonde transmitter, incorporating atmospherically sensitive instruments, borne aloft by a free balloon, and employing at the ground station a nondirectional receiver with a recording system adapted to translate the intercepted signals emitted by the radiosonde balloon in terms of meteorological conditions.

Thus, it is apparent from the foregoing discussion that in order to secure wind velocity as well as atmospheric temperature, humidity, and pressure data by conventional radio techniques it was heretofore necessary to conduct two distinct balloon flights entailing different ground receiving systems, a procedure both time-consuming and expensive.

Accordingly, it is the primary object of this invention to provide a meteorological telemetering system comprising a radiosonde balloon and a directional receiver adapted to track said balloon while concurrently receiving and recording radiosonde signals.

Another object of this invention is to provide a highly accurate directional receiver in conjunction with the above described system operating on the conical scan principal.

Yet another object of this invention is to provide a ground station in a system of the above type which is of simple, compact design enabling a portable construction.

Briefly stated, the objects of this invention are attained by employing a balloon-borne radiosonde transmitter wherein a radio carrier is pulse modulated at a repetition rate controlled by a meteorological instrument, and a ground station for intercepting the radiosonde signals comprising a conical scanning, directive antenna associated with a receiver in a manner whereby the modulation component yielded thereby consists both of the sinusoidal modulation frequency imposed on the incoming carrier by the conical scanning and the radiosonde pulse modulation frequency.

Provision is made for separating the two modulation components and applying the sinusoidal modulation to an indicator responsive to the phase and magnitude thereof whereby the relative position of the radiosonde transmitter with respect to the directive antenna is indicated, and applying the radiosonde pulse modulation to a frequency recorder. Consequently, the sinusoidal modulation enables the determination of the angular position of the radiosonde transmitter, at known time intervals and thereby the velocity of balloon travel, while the radiosonde pulse modulation provides readings of the atmospheric conditions measured by the radiosonde.

For a better understanding of this invention as well as other objects and further features thereof, reference is had to the following detailed description to be read in connection with the accompanying drawing wherein there is illustrated in block diagram form a preferred embodiment of a meteorological telemetering system comprising a radiosonde transmitter 10, borne aloft by a free balloon 11, said transmitter emitting signals which are intercepted at a ground receiving station 12.

The transmitter 10 is preferably of the well known Diamond-Hinman type, such as is described in "Research Paper RP 1329 in the Journal of Research of the National Bureau of Standards," vol. 25, September 1940, and includes an ultra-high frequency oscillator in association with a modulator in the form of a low-frequency blocking oscillator arranged to interrupt said oscillator for short periods of constant time duration in the order of 100-microseconds. Provision is also made for sequentially inserting in the modulator circuit various resistors whose respective value is a function of a distinct atmospheric condition as measured by a suitable meteorological instrument, each of said resistors controlling the rate of occurrence of these interruptions. In practice, the rate of occurrence ranges approximately from zero to two hundred cycles per second.

The radiosonde signals emanating from transmitter 10 are received at ground station 12 by a conical scan 13, coupled to a conventional receiver 14, tuned to the incoming carrier. Antenna 13 comprises a parabolic reflector 15 having a dipole 16 disposed therein which is bent sufficiently as to displace the electrical center thereof slightly away from the focal point of the reflector. Dipole 16 is rotated by a scanning motor 17 at a speed which, for the purpose of this description, will be assumed to be thirty revolutions per second. Dipole 16 produces an off-center lobe 18 which is rotated about the mechanical axis 19 of reflector 15 whereby the axis 20 of lobe 18 describes a cone in space around axis 19.

The characteristic of conical scanning antenna 13 is such that a received signal has the same intensity for all positions of lobe 18 when reflector axis 19 points to the source of radiation, which condition exists in the present system when axis 19 is in line with balloon 11. When axis 19 is angularly displaced from the radiation source, the received signal varies approximately sinusoidally with the rotation of lobe 18, the sinusoidal frequency being equal to the speed of lobe rotation, in this instance, thirty cycles. As lobe axis 20 nears the radiation source, the signal increases, and as lobe axis 20 departs therefrom, the signal decreases. Hence, the relative phase of the signal variation indicates the direction of balloon 11 from reflector axis 19 while the magnitude of signal variation indicates the distance away from reflector axis 19.

The present invention is not necessarily limited to any specific device for producing a conically scanned lobe, the invention being operable with any known device of this type. For example, conical scanning may also be accomplished by means of a rotating wave guide adapted to produce an off-center lobe. However, preferably employed for this function is the conical scanning antenna disclosed in my copending application entitled "Antenna lobe shifting device" (filed December 20, 1943, and given Serial Number 514,941), wherein the plane of polarization of the antenna is in the course of rotation remains constant. By arranging the antenna polarization to correspond to that of the radiosonde antenna, no modulation error is introduced as a result of varying polarization.

Dipole 16 is connected to the input stage of receiver 14 including a conventional detector which serves to recover the modulation components from the incoming carrier. Receiver 14 incorporates two amplifier channels, a channel 21 including a filter network arranged to pass thirty cycles and discriminate against all other frequencies, and a channel 22 including a filter network arranged to reject thirty cycles and accept all other frequencies within the radiosonde modulation range. Applied to amplifier channels 21 and 22 are both the sinusoidal thirty cycle modulation component and the pulse radiosonde modulation component.

Thus, in the output of channel 21 there appears the thirty cycle sinusoidal frequency, and, possibly, the fundamental wave of radiosonde pulses having a repetition rate of thirty per second. The output of channel 21 is impressed upon a suitable indicator 23, such as that of the cathode-ray oscilloscope type, responsive to the phase and magnitude of the sinusoidal modulation frequency in a manner whereby the angular displacement or pointing error of balloon 11 from reflector axis 19 is displayed both in elevation and azimuth. In operation, antenna 13 is then oriented until the sinusoidal modulation frequency is reduced to substantially zero level, at which point the reflector axis 19 is aligned with balloon 11. Whereupon, the angular position of balloon 11 with respect to the ground station is observed by the corresponding orientation of antenna 13.

As balloon 11 drifts with the wind, the position of antenna 13 is correspondingly shifted in order to track the balloon flight. At known intervals of time, the balloon angle is observed, and either by direct computation or graphical methods the path taken by the balloon is plotted to provide a measurement of wind velocity.

To facilitate the tracking operation, a suitable servo system 24 may be employed in conjunction with channel 21. The drive of system 24 is arranged to continuously control the orientation of antenna 13 in azimuth and in elevation in accordance with the phase and magnitude of the sinusoidal modulation frequency in a manner whereby antenna 13 is made to track balloon 11 automatically.

It is to be understood that the present invention is not limited to any particular embodiment of indicator 23 or servo system 24. Any known devices performing the desired functions may be employed herein.

It is to be noted that although the fundamental of radiosonde pulses having a thirty-cycle repetition rate may be present in the output of channel 21, their effect on indicator 23 and servo system 24 will be negligible. This is by reason of the fact that since the pulses are of very brief duration, in the order of one-hunderd microseconds, for repetition rates of thirty pulses per second, the fundamental of the square-wave pulse contains about 1% of the voltage in the entire pulse. Hence the effect of the filtered pulse or the behavior of indicator 23 and servo system 24 is relatively slight compared to the sinusoidal modulation signal.

The output of channel 22 consists solely of radiosonde pulses, the sinusoidal modulation being filtered out therein. Pulses having a repetition rate of thirty per second are not materially affected by the thirty cycle filter incorporated in channel 22 inasmuch as only a small percentage of the pulse energy is contained in the fundamental so that the other frequency components of the pulse which pass through the filter reform the pulse. The output of channel 22 is applied to a recording device comprising a conventional electronic frequency meter 25 and a high speed recording meter 26. Electronic frequency meter 25 furnishes a direct current output proportional to the frequency of the pulse input, but independent of its voltage or wave form. In order to make a record the direct-current output of meter 25 is applied to recording meter 26 where by means of a magnetically actuated vibrating stylus 27, a continuous line 28 is inscribed on a roll chart 29, giving instantaneous values of the pulse frequency. Roll chart 29 is uniformly rotated by a suitable motor 30.

Thus, there has been described a telemetering system, wherein radiosonde and wind velocity readings are concurrently furnished, which entails but a single balloon flight and a single ground receiving station.

While there has been shown what is considered to be a preferred embodiment of the invention, it will be obvious to those skilled in the art that various changes and modifications may be made therein without departing from the invention, and it is, therefore, aimed in the appended claims,

What is claimed is:

1. The combination in a meteorological telemetering system comprising a radiosonde transmitter, adapted to transmit a carrier pulse modulated at a relatively low frequency rate controlled by a meteorological instrument; an antenna, for intercepting said carrier at a ground station, adapted to produce a conically scanned lobe whereby said carrier is sinusoidally modulated; a receiver associated with said antenna for recovering the modulation components from said carrier; means in said receiver for separating the sinusoidal-modulation component from the pulse-modulation component; means responsive to said sinusoidal-modulation component for aligning the axis of said antenna with the spatial position of said transmitter; and means for recording the frequency of said pulse-modulation component.

2. The combination in a metorological telemetering system comprising a radiosonde transmitter, adapted to transmit a carrier pulse modulated at a relatively low frequency rate controlled by a meteorological instrument; an antenna, for intercepting said carrier at a ground station, adapted to produce a conically scanned lobe whereby said carrier is sinusoidally modulated; a receiver associated with said antenna for recovering the modulation components from said carrier; means in said receiver for separating the sinusoidal-modulation component from the pulse-modulation component; an indicator responsive to the phase and magnitude of said sinusoidal-modulation component for indicating the angular displacement of the axis of said antenna with respect to said transmitter; means for aligning said antenna axis with the spatial position of said transmitter; and means for recording the frequency of said pulse-modulation component.

3. The combination in a meteorological telemetering system comprising a radiosonde transmitter, adapted to transmit a carrier pulse modulated at a relatively low frequency rate controlled by a meteorological instrument; an antenna, for intercepting said carrier at a ground station, adapted to produce a conically scanned lobe whereby said carrier is sinusoidally modulated; a receiver, associated with said antenna, for recovering the modulation components from said carrier; means in said receiver for separating the sinusoidal-modulation component from the pulse-modulation component; an indicator responsive to the phase and magnitude of said sinusoidal-modulation component for indicating the angular displacement of the axis of said antenna with respect to said transmitter; a servo system, responsive to the phase and magnitude of said sinusoidal-modulation component, adapted to continuously orient said antenna whereby it tracks said transmitter; and means for recording the frequency of said pulse-modulation component.

4. The combination in a meteorological telemetering system comprising a radiosonde transmitter, adapted to transmit a carrier pulse modulated at a relatively low frequency rate controlled by a meteorological instrument; an antenna, for intercepting said carrier at a ground station, adapted to produce a conically scanned lobe whereby said carrier is sinusoidally modulated; a receiver, associated with said antenna, for recovering the modulation components from said carrier; means in said receiver for separating the sinusoidal-modulation component from the pulse-modulation component; an indicator, responsive to the phase and magnitude of said sinusoidal-modulation component, for indicating the angular displacement of the axis of said antenna with respect to said transmitter; a servo system, responsive to the phase and magnitude of said sinusoidal-modulation component, adapted to continuously orient said antenna whereby it tracks said transmitter; an electronic frequency meter for establishing a direct current proportional to the frequency of said pulse-modulation component; and a recording meter actuated by the direct-current output of said frequency meter adapted to inscribe instantaneous frequency values of said pulse-modulation component.

MORRIS KLINE.

No references cited.